United States Patent [19]
Kouns

[11] 3,821,922
[45] July 2, 1974

[54] QUICK CHANGE CONNECTION APPARATUS
[75] Inventor: Herbert H. Kouns, Camarillo, Calif.
[73] Assignee: Abex Corporation, New York, N.Y.
[22] Filed: Sept. 18, 1972
[21] Appl. No.: 289,891

[52] U.S. Cl.................................. 91/499, 417/454
[51] Int. Cl............................................... F01b 3/00
[58] Field of Search....... 417/269, 454; 91/472, 499

[56] References Cited
UNITED STATES PATENTS

| | | | |
|---|---|---|---|
| 2,146,123 | 2/1939 | Logan | 417/454 |
| 3,010,697 | 11/1961 | Lazo | 415/201 |
| 3,180,277 | 4/1965 | Thresher | 417/269 |
| 3,260,325 | 7/1966 | Brown et al. | 91/420 |
| 3,292,554 | 12/1966 | Hessler | 417/269 |
| 3,453,965 | 7/1969 | Heinrich | 91/499 |

Primary Examiner—William L. Freeh
Attorney, Agent, or Firm—Thomas S. Baker, Jr.; David A. Greenlee

[57] ABSTRACT

Quick change hydraulic connection apparatus suitable for removably mounting a rotatable hydraulic unit into fluid sealed relation with a complementary rotatable torque exchange device and also mounting said unit into torque transmitting relation with said device; includes a fluid manifold defining a plurality of manifold passages for fluids and connectable by fastener means between the device and the unit; the unit defines a plurality of unit passages for fluids which are adapted for registry with the manifold passages upon axial connection of the unit with the manifold; each passage of the manifold passages and the unit passages has complementary valve means to selectively close each respective passage upon disconnection of the unit from said manifold and to permit fluid flow through each respective passage when said unit and said manifold are connected into operative condition.

7 Claims, 4 Drawing Figures

QUICK CHANGE CONNECTION APPARATUS

BACKGROUND OF THE INVENTION

This invention generally pertains to manifold apparatus for mounting equipment together in torque transferring relationship and in fluid transferring relationship and also pertains to quick change fluid couplings incorporated with the manifold apparatus. The apparatus of this invention may be used, for example, to mount a rotatable hydraulic unit such as a hydraulic pump (or motor) with a complementary torque exchange device such as an aircraft engine.

There is a need for apparatus with which a hydraulic pump or motor may be quickly and conveniently dismounted from and mounted to an aircraft engine or the like with a minimum of time required and with a minimum loss of fluid from the pump and connecting fluid passages. The present invention fulfills such a need including such factors as envelope, strength, leakage, separating forces, differential expansion, fluid pressure drop, reliability, maintainability, performance, weight, and cost.

SUMMARY OF THE INVENTION

Briefly stated, the invention comprises quick change hydraulic connection apparatus suitable for removably mounting a rotatable hydraulic unit into fluid sealed relation with a complementary rotatable torque exchange device and also mounting said unit into torque transmitting relation with said device; includes a fluid manifold defining a plurality of manifold passages for fluids and connectable by fastener means between the device and the unit; the unit defines a plurality of unit passages for fluids which are adapted for registry with the manifold passages upon axial connection of the unit with the manifold; each passage of the manifold passages and the unit passages has complementary valve means to selectively close each respective passage upon disconnection of the unit from said manifold and to permit fluid flow through each respective passage when said unit and said manifold are connected into operative condition.

BRIEF DESCRIPTION OF THE DRAWING

FIG. 2 is a partial sectional view taken along the line 2—2 of FIG. 1 and showing a hydraulic pump connected through manifold apparatus of the present invention to an aircraft engine of the like.

DESCRIPTION OF THE PREFERRED EMBODIMENT

Figure 1:
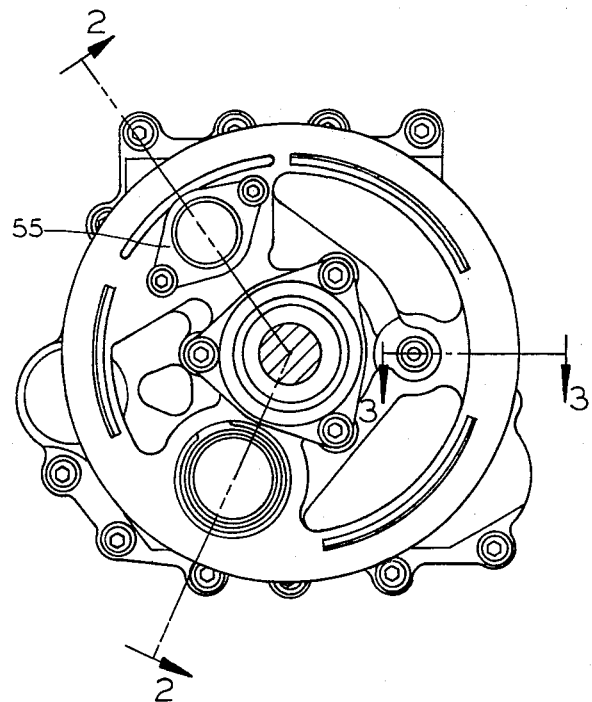
FIG. 1 is a partial sectional view generally taken along the line 1—1 of FIG. 2 and showing an axial view of a hydraulic pump.
Figure 2:
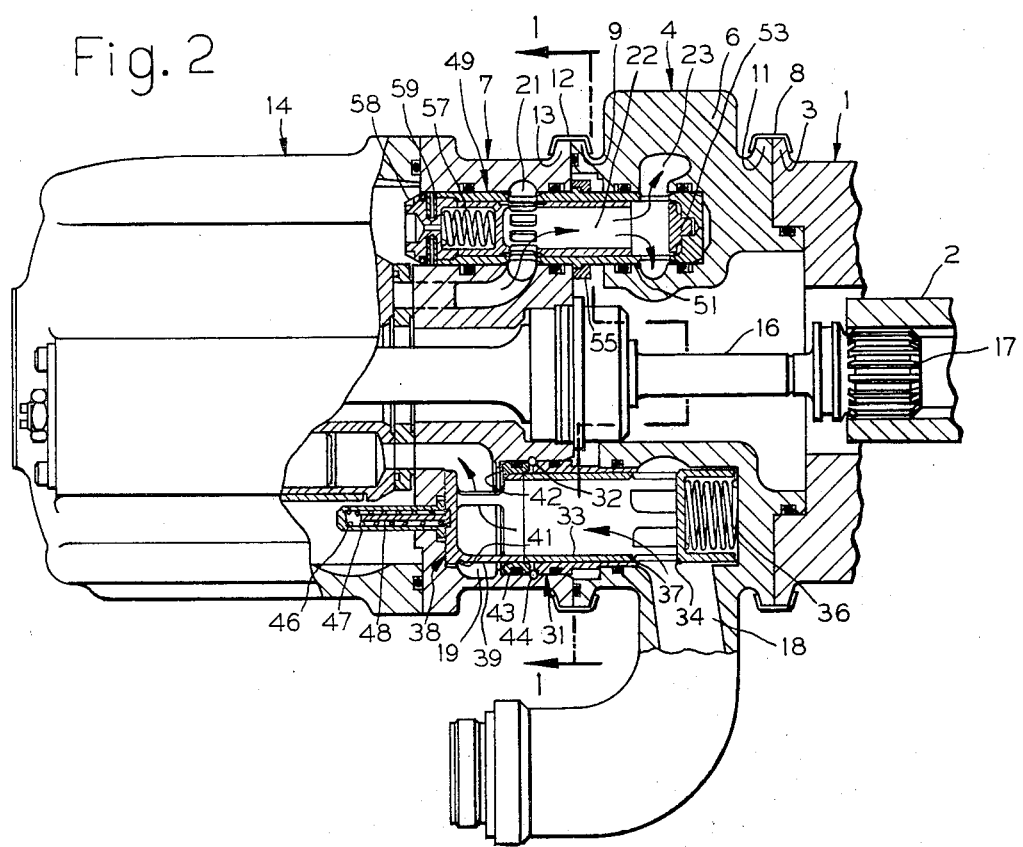
Figure 3:
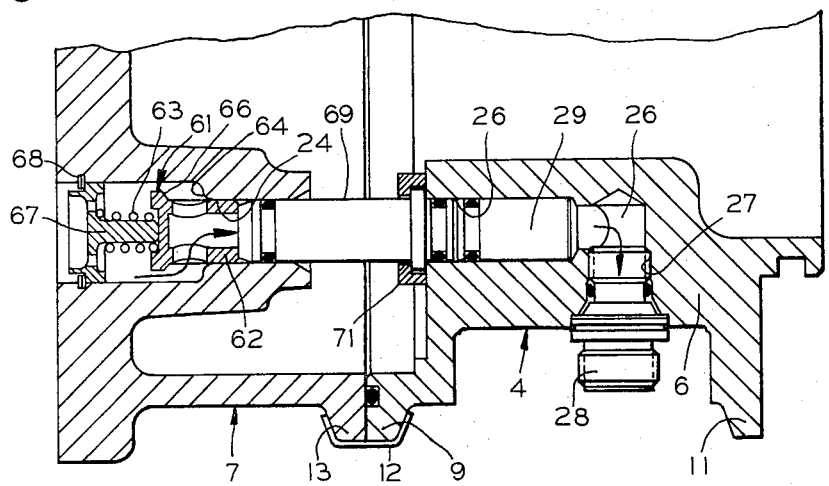
FIG. 3 is a sectional view taken along the line 3—3 of FIG. 1 and showing a drainage fluid connection from the pump into the manifold.

Referring to FIGS. 1–3, there is partially shown an aircraft engine or the like having a block 1 and including a splined driving hub 2. A circular clamp flange 3 is defined by the block around the driving hub. A manifold structure 4 including a manifold housing 6 and a pump port cap 7 is mounted to block 1 by means of a quick disconnect clamp 8, (a Marmon clamp, for example) hooped in tension around clamp flange 3 and a manifold clamp flange 11 which is defined by housing 6. Housing 6 defines an opposed clamp flange 9 which is attached by means of a second quick disconnect clamp 12 to a clamp flange 13 defined by port cap 7. Port cap 7 also comprises an operating component of a pump 14 which is mounted as shown with the port cap by conventional means such as cap screws (not shown). The pump 14 shown in FIG. 2 is of the axial piston type though other types of hydraulic pumps or motors may be employed. Additional detailed information concerning axial pumps of this kind may be found in U.S. Pat. Nos. 3,241,495 (Diedrich et al.), 3,304,885 (Kouns) and 3,437,015 (Kubilos) which patents are specifically incorporated herein by reference.

Pump 14 includes a drive shaft 16 terminating at its distal end in a spline 17 which is engaged in axial alignment within hub 2 when the pump 14, port cap 7, manifold housing 6 and block 1 are assembled as shown in FIG. 2.

As shown manifold housing 6 defines an inlet passage 18 disposed in registry with an inlet passage 19 defined through port cap 7 into pump 14. An outlet passage 21 is defined from pump 14, through port cap 7 into an outlet passage 22 defined in manifold housing 6. Outlet passage 22 extends into an exit port 23 which contains a conventional cartridge type check valve (not shown) which prevents flow reversal through outlet passage 22. The flow path through the apparatus is indicated by directional leader lines in FIG. 2.

As shown in FIG. 3, port cap 7 also defines a drain passage 24 extending from the interior of pump 14 into communication with a drain passage 26 defined in the manifold housing 6. Drain passage 26 terminates in an exit port 27 shown as receiving a tubing fitting 28. Drain passage 26 houses a check valve 29 as shown to prevent flow reversal. The flow path is indicated by directional leader lines.

Figure 4:
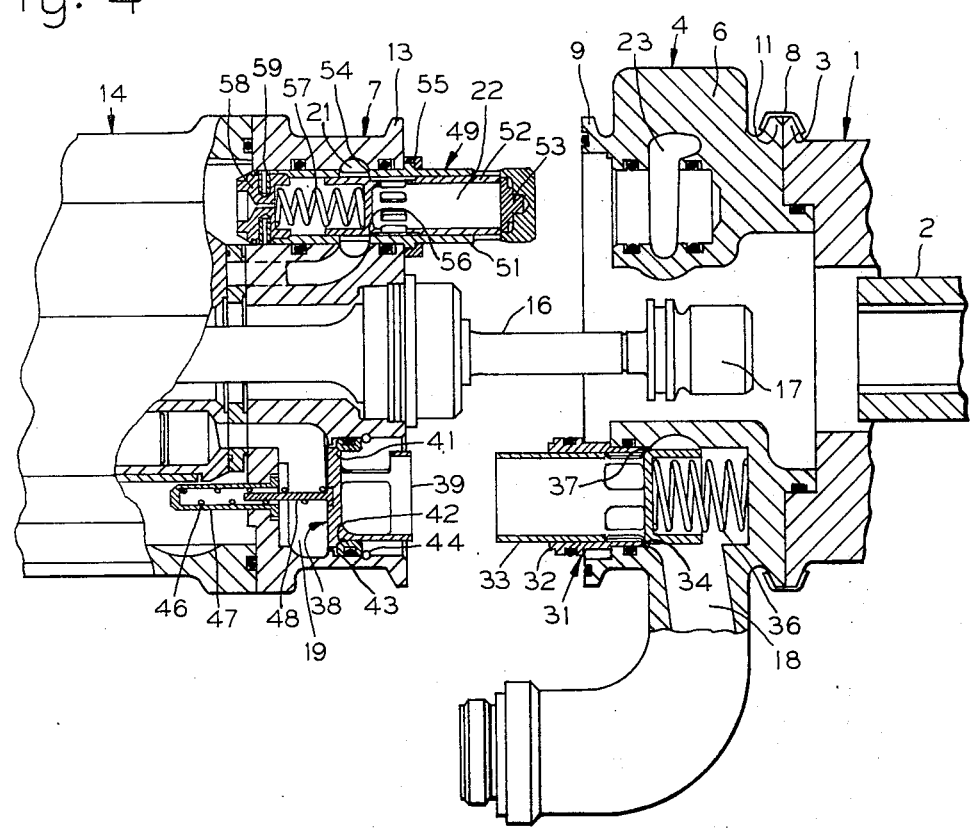
FIG. 4 is a sectional view similar to that of FIG. 2, but with the pump and manifold apparatus disconnected.

Referring to FIGS. 2 and 4 the manifold inlet passage is seen to house a spring biased sleeve type check valve assembly 31 comprising a retainer pilot sleeve 32 retained in the housing 6 by a snap ring for example, and retaining a ported shut off piston 33 having a seat 34. A spring 36 is provided to urge the piston 33 and seat 34 into sealing relation with a seat 37 provided at the inner end of pilot sleeve 32.

The inlet passage 19 of port cap 7 houses a spring biased valve assembly 38 including a ported poppet valve 39 having a seat 41 engageable with a seat 42 formed on a retainer sleeve 43. Sleeve 43 is retained within port cap 7 by means of a snap ring 44 or the like. Valve 39 is urged into seated and closed position by means of a spring 46 nested within a spring retainer sleeve 47 and following a valve spring guide 48 as shown in FIGS. 2 and 4.

The outlet passage of port cap 7 houses a normally closed shuttle valve assembly 49 in which is retained in the port cap 7, by means of a retaining collar 55 attached by fasteners such as cap screws or the like (not shown). The valve assembly 49 comprises a shuttle piston guide sleeve 51, retained as previously mentioned, which is ported at a location within port cap 7 for fluid communication with an annular portion of outlet passage 21 and ported near its distal end for fluid communication with an annular portion of manifold passage 22. Seals such as O-rings are provided to seal the sleeve within the annular portions of passages 21 and 22 when the apparatus is assembled as shown in FIG. 2.

Mounted in reciprocative relation within sleeve 51 is a ported shuttle piston valve member 52 which is adapted to engage a seat 53 when in extended position and to retract from the seat within its parts in fluid communication and with the parts of guide sleeve 51. A slight clearance is provided between a shoulder 54 formed by a port in guide sleeve 51 and a shoulder 56 provided by an undercut on valve member 52 across its parts. Upon operation of pump 14, fluid discharge pressure between shoulder 54 and 56 serves to retract valve member 52 into open position as shown in FIG. 2 and hold the valve open only at such time as fluid is being discharged through outlet passages 21 and 22. At such time the check valve in exit port 23 also remains open.

Valve member 52 is urged toward closed position by means of a spring 57 which is maintained in biased condition by a support plug 58. Plug 58 is retained in guide sleeve 51 by means of retainer pins 59 or the like as shown.

Referring to FIG. 3, the port cap drain passage 24 and manifold housing drain passage 26 are shown with respective complementary valve means in assembled condition as shown. A counter bore in passage 24 houses a drain valve assembly 61. Assembly 61 comprises a shouldered poppet valve 62 urged by a spring 63 toward the shoulder formed by the counter bore of passage 26. Such shoulders comprise valve seats 64 and 66 as shown. A spring retainer guide 67 retained within the counter bore by a snap ring 68 completes valve assembly 61.

The manifold drain passage 24 houses check valve 29 as previously described, which valve is retained as shown by a shouldered inner guide sleeve 69. Guide sleeve 69 is retained in position by a retainer collar 71 which is attached to housing 7 by means of cap screws or the like (not shown).

When the apparatus is assembled as shown in FIG. 2, the guide sleeve 69 extends into port cap passage 24 to push poppet valve 62 against spring 63 from a closed to an open position.

The manifold structure 4 is assembled as follows: The manifold housing 6 is installed with engine block 1 and clamped into place by clamp 8 as shown. The port cap 7 and pump 14 assembly is aligned with shaft 16 in axial alignment with hub 2 and the spline 17 is introduced into mesh with the spines in the hub. The pump assembly is rotated as necessary to align the pilot sleeve 32 with inlet passage 19; the shuttle guide sleeve with outlet passage 22; and the drain guide sleeve 69 with port cap drain passage 24. The assembly is then moved axially into connected position as shown in FIG. 2 and connected into operating position by means of clamp 12. During installation the manifold pilot sleeve 32 pushes poppet valve 39 against spring 46 until the valve is fully opened. Upon further axial movement the spring 36 begins to compress until the valve assembly 31 is fully opened.

At such time as installation is completed as described the inlet valves 31 and 38 and the drain port cap valve 61 are open. When the pump is started the pump port cap outlet valve 49 open and remains open responsive to discharge fluid pressure. The discharge check valve (not shown) and the drain check 29 also open responsive to fluid flow.

When the apparatus is disassembled as shown in FIG. 4 all passages in the pump port cap 7 and in the manifold housing 6 become closed which allows an insignificant amount of fluid to be lost from the pump or from the remaining hydraulic system. It is also seen that the apparatus permits rapid mounting and dismounting of the pump from the engine or the like, resulting in a minimum of lost working time for the equipment involved.

It is to be noted that the discharge pressure, as appearing in outlet passages 21 and 22 during operation of the pump, creates no separating force between the engine block 1, the manifold housing 6 and the port cap 7, as is the situation with conventional manifolds, due to the pressure balanced features of shuttle valve assembly 49. The discharge pressure, which may be in the order of several thousand p.s.i., is the only pressure that need be considered for a valve assembly such as valve assembly 49 in the embodiment shown. The inlet fluid pressures and the drain fluid pressures are not substantial enough to require such treatment. However the valve assembly 49 as shown could be used in any or all passages if needed.

The foregoing drawing and description will suggest other embodiments and variations to those skilled in the art, all of which are intended to be included in the spirit of the invention, as herein set forth.

That being claimed is:

1. In combination with a hydraulic unit removably mounted with a torque exchange device for transmitting power therebetween, a port cap affixed to one end of the hydraulic unit, a fluid manifold mounted between the port cap and the torque exchange device, means for releasably connecting the fluid manifold to the port cap, an inlet passage in the fluid manifold, a second inlet passage in the port cap in communication with the first mentioned inlet passage when the fluid manifold is connected to the port cap, an exhaust passage in the port cap, a second exhaust passage in the fluid manifold in communication with the first mentioned exhaust passage when the fluid manifold is connected to the port cap, the improvement comprising a quick disconnect apparatus for removing the hydraulic unit characterized by a valve in the first mentioned inlet passage movable alternatively between positions closing and opening the inlet passage, a second valve in the second inlet passage movable alternatively between positions closing and opening the second inlet passage, a third valve in the first mentioned exhaust passage movable alternatively between positions closing and opening the exhaust passage, and means for moving the first, second and third valves to their open positions when the hydraulic unit and torque exchange device are connected and operating, thereby preventing fluid loss from the hydraulic unit and fluid manifold when they are disconnected.

2. The combination recited in claim 1; including means for separating the fluid manifold from the torque exchange device.

3. The combination recited in claim 1; including means for moving each of the first valve, the second valve and the third valve to its respective closed position when the fluid manifold is separated from the port cap.

4. The combination recited in claim 1; wherein the fluid manifold and port cap include cooperating means for moving the first and second valves to their respective open positions.

5. The combination recited in claim 4; wherein means for moving the third valve to its open position includes fluid under pressure in the hydraulic unit.

6. The combination recited in claim 1; including a drain passage in the port cap, a second drain passage in the fluid manifold communicable with the first drain passage when the hydraulic unit and torque exchange device are connected; a fourth valve in the port cap movable alternatively between positions closing and opening the first drain passage, a fifth valve in the fluid manifold movable alternatively between positions closing and opening the second drain passage including means for moving the fourth valve and the fifth valve to their respective open positions when the hydraulic unit and the torque exchange device are connected and operating.

7. The combination recited in claim 6; including means for moving each of the fourth valve and the fifth valve to its respective closed position when the fluid manifold is separated from the port cap.

* * * * *